(12) United States Patent
Iwanaga et al.

(10) Patent No.: US 10,542,615 B2
(45) Date of Patent: Jan. 21, 2020

(54) LIQUID TREATMENT APPARATUS INCLUDING FIRST ELECTRODE, SECOND ELECTRODE, AND FIRST AND SECOND INSULATORS SURROUNDING LATERAL SURFACE OF FIRST ELECTRODE

(71) Applicant: Panasonic Intellectual Property Management Co., Ltd., Osaka (JP)

(72) Inventors: Junko Iwanaga, Osaka (JP); Tetsuya Takayanagi, Osaka (JP); Masahiro Ishida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 288 days.

(21) Appl. No.: 15/730,696

(22) Filed: Oct. 11, 2017

(65) Prior Publication Data
US 2018/0153027 A1    May 31, 2018

(30) Foreign Application Priority Data

Nov. 28, 2016   (JP) .................................. 2016-230707

(51) Int. Cl.
*H05H 1/34* (2006.01)
*H05H 1/44* (2006.01)
(Continued)

(52) U.S. Cl.
CPC ............. *H05H 1/44* (2013.01); *C02F 1/4608* (2013.01); *C02F 1/48* (2013.01); *H05H 1/30* (2013.01);
(Continued)

(58) Field of Classification Search
CPC ........ C02F 1/30; C02F 1/4608; C02F 2103/10; C02F 1/48; C02F 2001/46138;
(Continued)

(56) References Cited

U.S. PATENT DOCUMENTS 5,304,407 A    4/1994  Hayashi et al.
5,680,014 A   10/1997  Miyamoto et al.
(Continued)

FOREIGN PATENT DOCUMENTS

JP    5-044041    2/1993
JP    7-307199   11/1995
(Continued)

*Primary Examiner* — Walter D. Griffin
*Assistant Examiner* — Cameron J Allen
(74) *Attorney, Agent, or Firm* — McDermott Will & Emery LLP

(57) ABSTRACT

A liquid treatment apparatus includes a liquid storing vessel, a first electrode, a second electrode at least partly arranged inside the vessel, a tubular first insulator surrounding a first-electrode lateral surface with a first space interposed therebetween, and including a first opening in an end surface in contact with the liquid, a tubular second insulator surrounding the first-electrode lateral surface inside the first insulator, a gas supply device supplying gas into the first space and ejecting the gas into the liquid through the first opening, and a power supply applying a voltage between the first and second electrodes and producing plasma. The second insulator is arranged with a second space interposed between the first and second insulators. Portions of the first and second insulators, those portions being positioned inside the vessel, are covered with the gas when the gas is supplied into the first space by the gas supply device.

18 Claims, 11 Drawing Sheets

(51) Int. Cl.
*C02F 1/46* (2006.01)
*C02F 1/48* (2006.01)
*H05H 1/30* (2006.01)
*H05H 1/36* (2006.01)
*H05H 1/50* (2006.01)
*C02F 1/461* (2006.01)

(52) U.S. Cl.
CPC ............... *H05H 1/36* (2013.01); *H05H 1/50* (2013.01); *C02F 1/46109* (2013.01); *C02F 2001/46138* (2013.01)

(58) Field of Classification Search
CPC ............ H01J 37/32568; H01J 37/3244; H01J 37/32596; H01J 37/32541; H01J 37/32; H05H 1/48; H05H 1/44; H05H 2001/3468; H05H 1/36; H05H 1/30; H05H 1/50
See application file for complete search history.

(56) References Cited

U.S. PATENT DOCUMENTS

| | | | |
|---|---|---|---|
| 9,580,338 B2* | 2/2017 | Fujikane | ............... C02F 1/4608 |
| 2014/0054242 A1* | 2/2014 | Imai | ................... C02F 1/4608 210/748.17 |
| 2014/0231329 A1 | 8/2014 | Imai et al. | |
| 2015/0191371 A1* | 7/2015 | Fujikane | ............... B01J 19/088 422/186.04 |
| 2016/0332892 A1* | 11/2016 | Fujikane | .................. C02F 1/20 |

FOREIGN PATENT DOCUMENTS

| | | |
|---|---|---|
| JP | 2009-255027 | 11/2009 |
| WO | 2014/017020 | 1/2014 |

* cited by examiner

LIQUID TREATMENT APPARATUS INCLUDING FIRST ELECTRODE, SECOND ELECTRODE, AND FIRST AND SECOND INSULATORS SURROUNDING LATERAL SURFACE OF FIRST ELECTRODE

BACKGROUND

1. Technical Field

The present disclosure relates to a liquid treatment apparatus utilizing plasma.

2. Description of the Related Art

Techniques utilizing plasma for purification, sterilization, etc. of liquids are known so far. Japanese Patent No. 5796174, for example, discloses a liquid treatment apparatus in which gas is supplied into a liquid and plasma is produced in the supplied gas.

SUMMARY

In one general aspect, the techniques disclosed here feature a liquid treatment apparatus including a vessel for storing a liquid, a first electrode, a second electrode at least a part of which is arranged inside the vessel, a first insulator having a tubular shape and a first opening at an end of the first insulator, the first insulator surrounding a lateral surface of the first electrode with a first space interposed between the first insulator and the lateral surface of the first electrode, a second insulator having a tubular shape, the second insulator surrounding the lateral surface of the first electrode, a gas supply device that supplies gas into the first space and ejects the gas into the liquid through the first opening, and a power supply that applies a voltage between the first electrode and the second electrode and produces plasma. The first insulator surrounds the second insulator. The second insulator is arranged with a second space interposed between the first insulator and the second insulator. The first opening of the first insulator is arranged to be in contact with the liquid when the liquid is stored in the vessel. A portion of the first electrode, which is positioned inside the vessel, and a portion of the second insulator, which is positioned inside the vessel, are covered with the gas when the liquid is filled in the vessel and the gas is supplied into the first space by the gas supply device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The inventor of this application has found that, when a treatment target liquid (tap water) is treated using the liquid treatment apparatus disclosed in Japanese Patent No. 5796174, discharge comes into an unstable state after about three minutes from the start of the discharge. The inventor of this application has further visually found that a precipitate is deposited near an opening of an insulator after five minutes from the start of the discharge.

Figure 1:
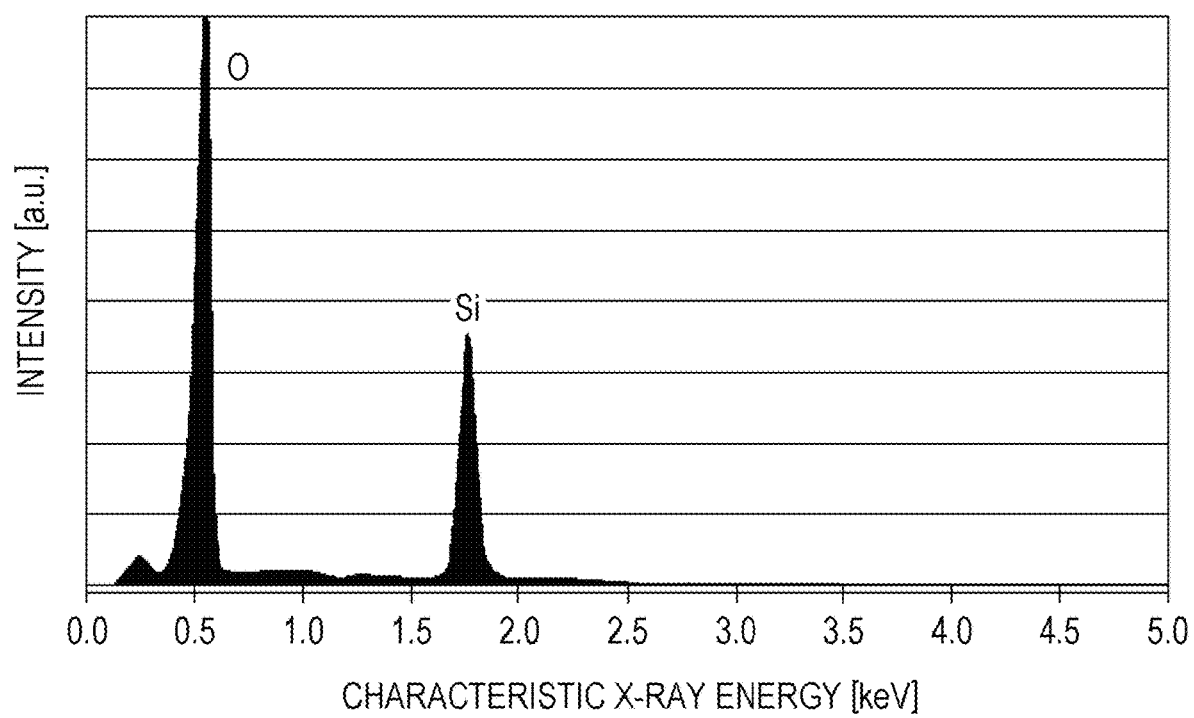
FIG. 1 represents an analysis result of a precipitate deposited on an insulator.

FIG. 1 is a graph depicting an analysis result of the precipitate deposited on the insulator. More specifically, FIG. 1 depicts a result of analyzing the precipitate with the so-called EDX (Energy Dispersive X-ray) analysis. In FIG. 1, a horizontal axis represents characteristic X-ray energy, and a vertical axis represents the intensity (count value) of the characteristic X-ray energy.

As seen from FIG. 1, the precipitate is a compound of silicon oxide ($SiO_2$). The inventor of this application has studied, as discussed below, the reason why the precipitate is deposited on an inner surface of the insulator.

In the liquid treatment apparatus disclosed in Japanese Patent No. 5796174, the spacing between a first electrode and the insulator is as small as about 0.1 mm, and a strong electric field is generated. Therefore, discharge occurs between the first electrode and the insulator. Furthermore, when a high voltage is applied to an electrode surrounded by a tubular insulator having an opening, such as represented by the first electrode disclosed in Japanese Patent No. 5796174, Maxwell stress is imposed on the gas-liquid interface of the treatment target liquid near the opening of the insulator depending on an electric field that is generated at the gas-liquid interface. Accordingly, the treatment target liquid enters the inside of the insulator along its inner surface from the opening of the insulator (called electro-osmosis). Thus, it is deemed that, because the inner surface of the insulator in a state wetted with the treatment target liquid is exposed to plasma produced by the above-mentioned discharge, silica contained in the treatment target liquid is precipitated on the inner surface of the insulator. In other words, it is deemed that the precipitate is a substance formed through precipitation of silica contained in the treatment target liquid.

When the precipitate is formed near the opening, discharge is generated between the precipitate and the first electrode. Hence the discharge generated between the first electrode and the treatment target liquid comes into an unstable state.

In view of the above-described situation, a liquid treatment apparatus according to one aspect of the present disclosure includes a vessel for storing a liquid, a first electrode, a second electrode at least a part of which is arranged inside the vessel, a first insulator having a tubular shape and a first opening at an end of the first insulator, the first insulator surrounding a lateral surface of the first electrode with a first space interposed between the first insulator and the lateral surface of the first electrode, a second insulator having a tubular shape, the second insulator surrounding the lateral surface of the first electrode, a gas supply device that supplies gas into the first space and ejects the gas into the liquid through the first opening, and a power supply that applies a voltage between the first electrode and the second electrode and produces plasma. The first insulator surrounds the second insulator. The second insulator is arranged with a second space interposed between the first insulator and the second insulator. The first opening of the first insulator is arranged to be in contact with the liquid when the liquid is stored in the vessel. A portion of the first electrode, which is positioned inside the vessel, and a portion of the second insulator, which is positioned inside the vessel, are covered with the gas when the liquid is filled in the vessel and the gas is supplied into the first space by the gas supply device.

Here, the second insulator may be in contact with the lateral surface of the first electrode.

According to that aspect, since the second insulator is not in contact with the liquid, the liquid containing substances such as silica is less apt to enter the inside of the second insulator along an inner surface thereof, and the substances in the liquid hard to precipitate even when discharge is generated between the first electrode and the inner surface of the second insulator. Moreover, since the second insulator is not in contact with the liquid, a bias is not directly applied to the second insulator from the liquid, and an electric potential difference between the first electrode and the second insulator is relatively small. Therefore, the discharge is more apt to occur between the end surface of the first electrode and the gas-liquid interface, and is less apt to occur between the first electrode and the second insulator. Accordingly, the plasma produced by the discharge is less apt to contact the inner surface of the second insulator, whereby precipitates of substances such as silica can be suppressed from being deposited on the inner surface of the second insulator.

Because the end surface of the first insulator is in contact with the liquid, there is a possibility that the liquid may enter the inside of the first insulator along its inner surface from the end surface of the first insulator. With the presence of the second insulator between the first electrode and the first insulator, however, the discharge is less apt to occur between the first electrode and the first insulator, and the substances such as silica are harder to precipitate on the inner surface of the first insulator. Furthermore, since the first insulator is arranged outside the second insulator, an electric field causing the liquid to enter the inside of the first insulator along its inner surface is relatively small. Accordingly, electro-osmosis of the liquid along the inner surface of the first insulator is suppressed, and the precipitation of the substances in the liquid is suppressed.

As a result, the liquid treatment apparatus according to one aspect of the present disclosure can stably produce the plasma.

In an example of the liquid treatment apparatus according to one aspect of the present disclosure, at least a part of the first electrode may be positioned below a surface level of the liquid.

With the feature described above, when the gas is not supplied, the first electrode is located at a position where the first electrode contacts the liquid. In other words, since the first electrode is arranged at a position near the liquid, the plasma can be produced in a state coming into contact with the liquid. Thus, since active species generated by the plasma are more apt to spread into the liquid, efficiency of liquid treatment can be increased.

In an example of the liquid treatment apparatus according to one aspect of the present disclosure, an end surface of the first electrode and an end surface of the second insulator may be retracted from the first opening toward an interior of the first space.

With the feature described above, since a distance between each of the first electrode and the second insulator and the liquid can be increased, the liquid is less apt to enter the inside of the second insulator along its inner surface. As a result, the substances in the liquid are harder to precipitate, and the plasma can be produced more stably.

In an example of the liquid treatment apparatus according to one aspect of the present disclosure, the first electrode may include a circular columnar portion, the first insulator and the second insulator may surround a lateral surface of the circular columnar portion, and the circular columnar portion, the first insulator, and the second insulator may be arranged coaxially.

With the features described above, electric potential distribution around the first electrode can be stabilized. More specifically, a strong electric field is less apt to occur locally. As a result, the substances in the liquid are harder to precipitate, and the plasma can be produced more stably.

In an example of the liquid treatment apparatus according to one aspect of the present disclosure, the second insulator may surround the lateral surface of the first electrode with a third space interposed between the second insulator and the lateral surface of the first electrode, and may include a second opening at an end surface of the second insulator.

In an example of the liquid treatment apparatus according to one aspect of the present disclosure, an end surface of the first electrode may be retracted from the second opening toward an interior of the third space.

With the feature described above, since the end surface of the first electrode is retracted from the second opening of the second insulator, the discharge is less apt to occur between the end surface of the first electrode and the first insulator. Accordingly, even if the liquid enters the inside of the first insulator along its inner surface, the liquid having entered is less exposed to the plasma. As a result, the substances in the liquid are harder to precipitate, and the plasma can be produced more stably.

In the liquid treatment apparatus according to one aspect of the present disclosure, when an inner diameter of the first insulator is increased, an electric field at the inner surface of the first insulator near the first opening thereof is reduced. By increasing the inner diameter of the first insulator, therefore, the liquid is less apt to enter the inside of the first insulator along its inner surface, and hence precipitation of the substances in the liquid can be suppressed.

However, when the inner diameter of the first insulator is increased, the gas is supplied in a larger amount and at a higher flow velocity to fill an inner space of the first insulator with the gas. This may lead to a possibility that the gas-liquid interface is moved away from the end surface of the first electrode, and that the discharge is less apt to occur.

To cope with the above point, in an example of the liquid treatment apparatus according to one aspect of the present disclosure, an end surface of the first electrode may be projected from the second opening.

With the feature described above, since the end surface of the first electrode and the gas-liquid interface can be positioned closer to each other, the discharge is more apt to occur, and the plasma can be produced more stably.

In an example of the liquid treatment apparatus according to one aspect of the present disclosure, the gas supply device may eject the gas into the liquid through the second space.

With the feature described above, the gas can be introduced so as to cover the first electrode, and the gas-liquid interface can be formed in a stable state. Since the gas-liquid interface is stabilized, the discharge is also stabilized, and the plasma can be produced more stably.

In an example of the liquid treatment apparatus according to one aspect of the present disclosure, the gas supply device may eject the gas into the liquid through the second space and the third space.

With the feature described above, since the gas flows along the first electrode, the gas can dissipate heat of the first electrode. Since heat is less apt to accumulate in the first electrode, electric potential distribution of the first electrode is stabilized, and the discharge is also stabilized. As a result, the plasma can be produced more stably.

Embodiments will be described in detail below with reference to the drawings.

It is to be noted that the embodiments described below represent non-exclusive or specific examples. Numerical values, shapes, materials, components, layout positions and connection forms of the components, steps, and sequences of the steps, which are described in the following embodiments, are merely illustrative, and they are not purported to limit the present disclosure. Among the components in the following embodiments, those ones not stated in the independent claim, which defines the most significant concepts, are described as optional components.

It is also to be noted that the drawings are schematically illustrated in simplified forms and are not illustrated exactly in a strict sense. Thus, scales of the drawings, for example, may be not in match with one another among some of the drawings. Throughout the drawings, substantially the same components are denoted by the same reference signs, and duplicate description of those components is omitted or simplified.

Embodiment

1. Outline

Figure 2:
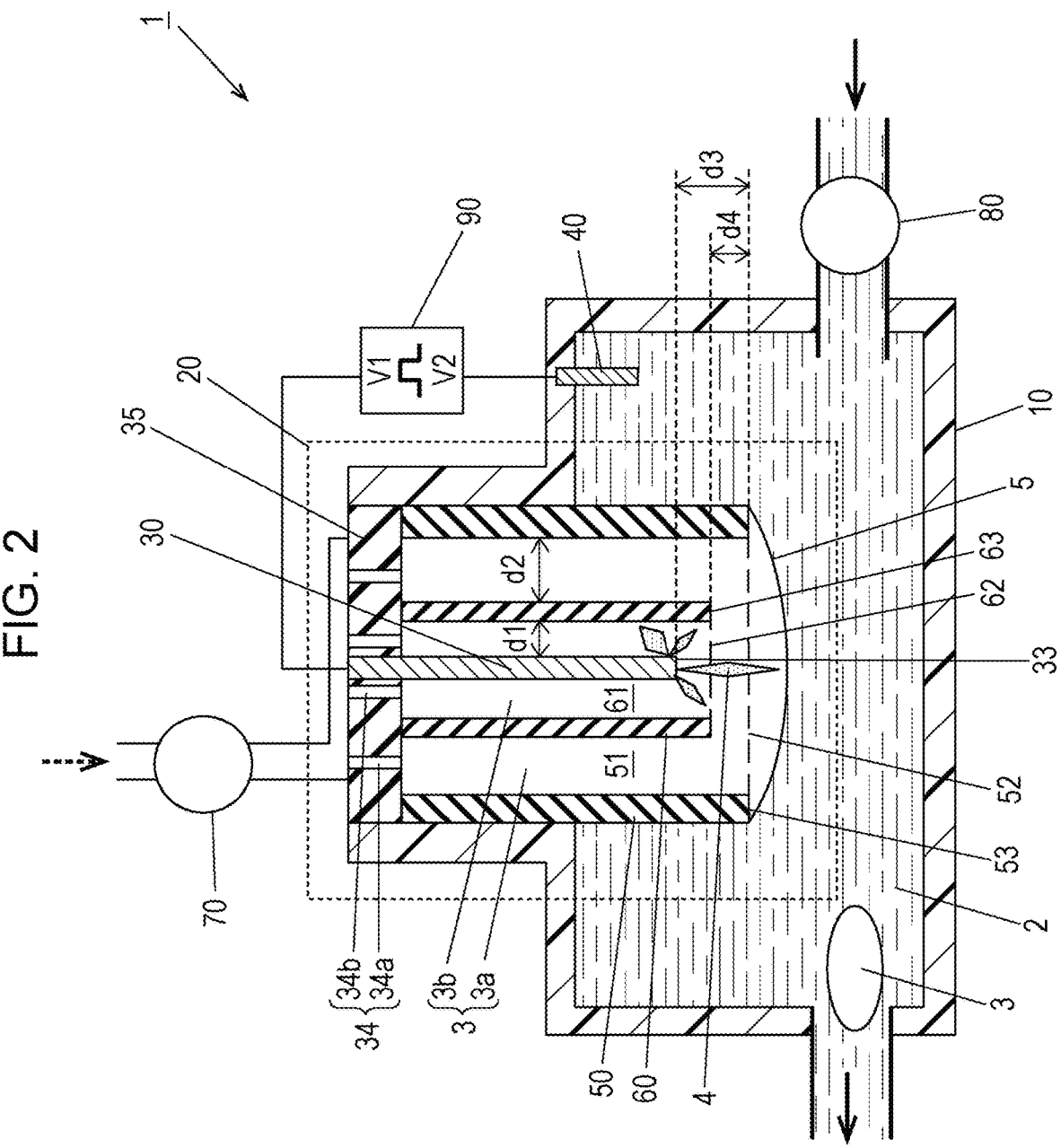
FIG. 2 illustrates a structure of a liquid treatment apparatus according to an embodiment.

At the beginning, an outline of a liquid treatment apparatus 1 according to an embodiment is described with reference to FIG. 2. FIG. 2 illustrates a structure of the liquid treatment apparatus 1 according to the embodiment. FIG. 2 schematically illustrates, as a sectional view, main components of the liquid treatment apparatus 1, such as a reaction vessel 10, an electrode section 20, and a second electrode 40.

In the liquid treatment apparatus 1, as illustrated in FIG. 2, plasma 4 is produced in gas 3 that is supplied into a liquid 2. The gas 3 supplied into the liquid 2 is present as bubbles in the liquid 2. The bubbles formed by the gas 3 may be present in a state where a gas-liquid interface is closed within the liquid 2 or is communicated with an external space.

The liquid 2 is a liquid as a target to be treated by the liquid treatment apparatus 1. The liquid 2 is, for example, water such as tap water or pure water, or an aqueous solution.

The gas 3 is air outside the liquid treatment apparatus 1, but the gas 3 is not limited to the outside air. The gas 3 may be gas made of a pure substance, such as argon, helium, nitrogen or oxygen, or a mixture of two or more among those pure substances.

The liquid treatment apparatus 1 produces the plasma 4 in the gas 3, thereby generating reactive species, such as active species and chemical species, in the gas 3. The reactive species include, for example, hydroxy radical (OH), hydrogen radical (H), oxygen radical (O), superoxide anion ($O_2^-$), univalent oxygen ion ($O^-$), hydrogen peroxide ($H_2O_2$), nitrogen monoxide (NO), nitrogen dioxide ($NO_2$), dinitrogen monoxide ($N_2O$), dinitrogen tetroxide ($N_2O_4$), nitrous acid ($HNO_2$), nitric acid ($HNO_3$), and peroxynitrite (ONOOH). The generated reactive species react with substances evaporated from the liquid 2 and substances existing at a gas-liquid interface 5, thereby decomposing or synthesizing those substances into different substances. When temperature of the gas 3 is increased to high temperature by the plasma 4, substances vaporized into the gas 3 are further decomposed by combustion reaction.

Moreover, the reactive species generated in the gas 3 are taken into the liquid 2 via the gas-liquid interface 5 through dissolution or hydration. Accordingly, the reactive species generated by the plasma include a nitrite ion ($NO_2^-$) and a nitrate ion ($NO_3^-$) in addition to the above-described reactive species.

Because the generated reactive species decompose target substance, which are to be decomposed and which are contained in the liquid 2, the liquid treatment apparatus 1 is able to sterilize the liquid 2. Moreover, the liquid treatment apparatus 1 is able to sterilize another liquid or gas by employing the liquid 2 containing the reactive species (i.e., the liquid 2 having been subjected to plasma treatment). Because the plasma-treated liquid 2 can decompose or synthesize substances by utilizing redox potential of the reactive species, the liquid treatment apparatus 1 can be applied to not only sterilization, but also to various fields for other objects.

2. Structure

A structure of the liquid treatment apparatus 1 according to the embodiment will be described below.

As illustrated in FIG. 2, the liquid treatment apparatus 1 includes the reaction vessel 10, a first electrode 30, a holder 35, a second electrode 40, a first insulator 50, a second insulator 60, a gas supply pump 70, a liquid supply pump 80, and a power supply 90. The first electrode 30, the holder 35, the first insulator 50, and the second insulator 60 constitute the electrode section 20.

Individual components of the liquid treatment apparatus 1 will be described in detail below.

2-1. Reaction Vessel

The reaction vessel 10 is a vessel in which the liquid 2 is stored. The first electrode 30 and the second electrode 40 are at least partly arranged inside the reaction vessel 10. The reaction vessel 10 may have any suitable external shape, such as the shape of a rectangular parallelepiped, a circular column, or a sphere. The reaction vessel 10 may be, for example, a liquid storage tank having an opened portion, or a tray opened upward.

A reaction rate of the liquid 2 in the reaction vessel 10 is increased with stirring. In view of that point, the liquid 2 may be, for example, circulated in the reaction vessel 10 by employing the liquid supply pump 80, or stirred by employing a stirrer or the like.

In FIG. 2, a direction in which the liquid 2 flows in the reaction vessel 10 is denoted by solid-line arrows. The liquid 2 outgoing from the reaction vessel 10 is circulated through not-illustrated piping, etc., and is returned to flow into the reaction vessel 10 again.

The reaction vessel 10 is formed using, for example, an acid-resistant material. The reaction vessel 10 is made of, for example, a fluorine resin such as polytetrafluoroethylene, silicone rubber, polyvinylchloride, stainless steel, ceramic, or an acrylic resin.

The first electrode 30 and the second electrode 40 are at least partly arranged in an internal space (specifically, a space where the liquid 2 is stored) of the reaction vessel 10. When the reaction vessel 10 is a closed vessel, for example, the first electrode 30 and the second electrode 40 are arranged in a state penetrating through a wall of the reaction vessel 10.

In this embodiment, the liquid 2 is filled in the reaction vessel 10. In the reaction vessel 10, the plasma 4 is produced with discharge caused in the gas 3, which is supplied to the inside of the first insulator 50 from the gas supply pump 70, between the first electrode 30 and the gas-liquid interface 5 or between the first electrode 30 and the second insulator 60.

2-2. Electrode Section

The electrode section 20 constitutes an electrode unit including the first electrode 30 that is one of a pair of electrodes equipped in the liquid treatment apparatus 1. The electrode section 20 has a structure enabling the first electrode 30 to be covered with the gas 3 in order to generate the plasma 4 near the first electrode 30. More specifically, the electrode section 20 includes the first electrode 30, the holder 35, the first insulator 50, and the second insulator 60.

2.2.1. First Electrode

The first electrode 30 is one of the pair of electrodes for producing the plasma 4. The first electrode 30 is used as an electrode for reaction, and the plasma 4 is produced around the first electrode 30.

The first electrode 30 includes a portion having an elongate circular-columnar shape, for example. In this embodiment, the first electrode 30 is an elongate circular-columnar member. A diameter of the first electrode 30 is just needed to be capable of producing the plasma 4, and it may be equal to or less than 2 mm, for example. Here, the diameter of the first electrode 30 is described as being 0.8 mm, by way of example. A tip of the circular columnar portion of the first electrode 30, the tip defining an end surface 33, may be pointed. Thus, a tip portion of the first electrode 30 may have an elongate conical shape.

The first electrode 30 consists of a metal material, such as tungsten, aluminum, iron, copper, or an alloy of any of those metals. However, materials of the first electrode 30 are not limited those examples.

In this embodiment, the end surface 33 of the first electrode 30 is located at a position retracted from a second opening 62 of the second insulator 60 toward the interior of a space 61 by a distance denoted by d3. Here, the retracted distance d3 is set to a range within which discharge occurs between the end surface 33 of the first electrode 30 and the gas-liquid interface 5. The retracted distance d3 is not less than 0.1 mm and not more than 3 mm, for example, though depending on an applied voltage. With such an arrangement, the first electrode 30 is more easily covered with the gas 3, and hence the first electrode 30 can be suppressed from contacting the liquid 2.

In this embodiment, at least a part of the first electrode 30 is positioned below a surface level of the liquid 2. More specifically, the first electrode 30 is substantially vertically inserted into the liquid 2 from above the surface level such that the end surface 33 is dipped in the liquid 2. The first insulator 50 and the second insulator 60 are also placed in a similar state. Thus, the end surface 33 of the first electrode 30 is located at such a position that the end surface 33 comes into contact with the liquid 2 when the gas 3 is not supplied by the gas supply pump 70, and that it is covered with the gas 3 and does not contact the liquid 2 when the gas 3 is supplied.

2-2-2. Holder

The holder 35 is a member for holding the first electrode 30. In this embodiment, the holder 35 holds the first electrode 30, the first insulator 50, and the second insulator 60 such that those components can be mounted at predetermined positions in the reaction vessel 10. The holder 35 is made of, for example, an insulator, namely a material that is less susceptible to dielectric breakdown. However, materials of the holder 35 are not limited to such an example. The holder 35 may be made of another suitable material insofar as short-circuiting does not occur between the first electrode 30 and the second electrode 40.

In this embodiment, the holder 35 functions as a part of the reaction vessel 10. A plurality of through-holes 34 is formed in the holder 35. The plurality of through-holes 34 are gas supply holes through which the gas from the gas supply pump 70 is fed to the inside of the first insulator 50.

The plurality of through-holes 34 are each in communication with a space 51 or a space 61 that are defined inside the first insulator 50. More specifically, as illustrated in FIG. 2, the plurality of through-holes 34 includes a through-hole 34a in communication with the space 51 and a through-hole 34b in communication with the space 61. Therefore, from the gas supply pump 70, the gas 3 is supplied to the space 51 via the through-hole 34a, and the gas 3 is supplied to the space 61 via the through-hole 34b. Thus, the gas 3 supplied from the gas supply pump 70 is ejected into the liquid 2, which is stored in the reaction vessel 10, from a first opening 52 of the first insulator 50 via the through-holes 34, the space 51, and the space 61. The space 51 corresponds to a second space in the present disclosure, and the space 61 corresponds to a third space in the present disclosure. A total of the space 51 and the space 61 corresponds to a first space in the present disclosure.

Alternatively, only the through-hole 34a may be formed in the holder 35. In other words, just one through-hole 34 may be in communication the space 51, and the gas 3 may be supplied to the reaction vessel 10 via the space 51 alone. Also in such a case, the first electrode 30 and the second insulator 60 are covered with the supplied gas 3, and they do not contact the liquid 2.

2-2-3. Insulators

The first insulator 50 is arranged in a state surrounding a lateral surface of the first electrode 30 with a space interposed therebetween. As illustrated in FIG. 2, the second insulator 60 is arranged on the inner side of the first insulator 50. Thus, an inner space of the first insulator 50 is divided by the second insulator 60 into the space 51 on the side closer to the first insulator 50 (i.e., on the outer side), and the space 61 on the side closer to the first electrode 30 (i.e., on the inner side).

More specifically, the first insulator 50 is arranged in a surrounding relation to an outer surface of the second insulator 60 with the space 51 interposed therebetween. In other words, the second insulator 60 and the first insulator 50 are arranged with the space 51 interposed therebetween. Thus, the second insulator 60 is arranged on the inner side of the first insulator 50 in a surrounding relation to the lateral surface of the first electrode 30 with the space 61 interposed therebetween.

The first insulator 50 is a tubular insulator having the first opening 52 that is formed at a first end surface 53 in contact with the liquid 2. The second insulator 60 is a tubular insulator having the second opening 62 that is formed at a second end surface 63 corresponding to the first end surface 53. The first end surface 53 and the second end surface 63 are end surfaces that are positioned on the same side, namely on the side where the gas 3 is ejected into the liquid 2 (i.e., on the opposite side to the holder 35).

In this embodiment, the first insulator 50 and the second insulator 60 are each an elongate circular-tubular member surrounding the lateral surface of the first electrode 30. A wall width (thickness) of each of the first insulator 50 and the second insulator 60 is substantially uniform and is 0.5 mm, for example. The wall width of the first insulator 50 and the wall width of the second insulator 60 may be equal to or different from each other. In this embodiment, the first electrode 30, the first insulator 50, and the second insulator 60 are arranged coaxially. More specifically, when looking at the end surface 33 of the first electrode 30 from a facing direction, the first insulator 50 and the second insulator 60 are arranged in a concentric relation with the first electrode 30 being a center.

In this embodiment, an inner diameter of the second insulator 60 is larger than an outer diameter of the first electrode 30. The space 61 is formed in a circular tubular shape over an entire periphery of the first electrode 30. In other words, the outer (lateral) surface of the first electrode 30 and an inner surface of the second insulator 60 are not in contact with each other. A width d1 of the space 61 is, for example, substantially uniform over the entire periphery of the first electrode 30. The width d1 denotes a distance between the outer (lateral) surface of the first electrode 30 and the inner surface of the second insulator 60, and it is, for example, not less than 0.1 mm and not more than 3 mm. However, a value of the width d1 is not limited to such an example.

With the presence of the space 61 between the first electrode 30 and the second insulator 60, the first electrode 30 does not contact the second insulator 60. In an example, the inner diameter of the second insulator 60 is 1 mm, and the outer diameter of the first electrode 30 is 0.8 mm. Thus, the width d1 of the space 61 is 0.1 mm.

An inner diameter of the first insulator 50 is larger than an outer diameter of the second insulator 60. The space 51 is formed in a circular tubular shape over an entire periphery of the second insulator 60. In other words, an outer surface of the second insulator 60 and an inner surface of the first insulator 50 are not in contact with each other. A width d2 of the space 51 is, for example, substantially uniform over the entire periphery of the second insulator 60. The width d2 denotes a distance between the outer surface of the second insulator 60 and the inner surface of the first insulator 50, and it is, for example, not less than 1 mm and not more than 10 mm. However, a value of the width d2 is not limited to such an example.

With the presence of the space 51 between the second insulator 60 and the first insulator 50, the second insulator 60 does not contact the first insulator 50. In an example, the inner diameter of the first insulator 50 is 7 mm, and the outer diameter of the second insulator 60 is 2 mm. Thus, the width d2 of the space 51 is 2.5 mm.

In this embodiment, as described above, the first electrode 30 is surrounded by double tubular insulators. The first end surface 53 and a part of the outer surface of the first insulator 50, which is a tube on the outer side, are in contact with the liquid 2. When the gas 3 is supplied by the gas supply pump 70, the supplied gas 3 fills the space 51 and the space 61. Therefore, the first electrode 30 and the second insulator 60 are covered with the supplied gas 3, and they do not contact the liquid 2.

The gas 3 supplied to the space 51 and the space 61 is ejected into the liquid 2 within the reaction vessel 10 through the first opening 52. The ejected gas 3 becomes bubbles and diffuses into the liquid 2. The first opening 52 has a function of determining an upper limit in size of the bubbles at that time.

In this embodiment, the first end surface 53 of the first insulator 50 is projected outward in comparison with the second end surface 63 of the second insulator 60. Moreover, the second end surface 63 of the second insulator 60 is located at a position retracted from the first opening 52 toward the interior of the space 51 by a distance denoted by d4. The retracted distance d4 is not less than 0.1 mm and not more than 3 mm, for example. With such an arrangement, the gas 3 can be held inside the first insulator 50, and hence the first electrode 30 and the second insulator 60 can be steadily covered with the gas 3.

The first insulator 50 and the second insulator 60 are each made of alumina ceramic, for example. Alternatively, the first insulator 50 and the second insulator 60 may be each made of magnesia, zirconia, quarts, or yttrium oxide, for example.

The first insulator 50 and the second insulator 60 may be each a rectangular tubular member instead of a circular tubular member. Although the first insulator 50 and the second insulator 60 are held by the holder 35 in the embodiment, they may be fixed to a wall surface of the reaction vessel 10. Additionally, the second insulator 60 may be held by the holder 35 together with the first insulator 50.

A gap between the first insulator 50 and the holder 35 or a gap between the first insulator 50 and the wall surface of the reaction vessel 10 may be filled by an adhesive such as an epoxy adhesive. This is effective in suppressing a possibility that the liquid 2 may enter the inside of the first insulator 50 (i.e., the space 51) from those gaps and may make the discharge unstable.

2-3. Second Electrode

The second electrode 40 is the other of the pair of electrodes for producing the plasma 4. The second electrode 40 is at least partly arranged in the liquid 2. More specifically, a part of the second electrode 40 is arranged inside the reaction vessel 10 and is brought into contact with the liquid 2. With such an arrangement, a voltage is applied to the liquid 2 from the second electrode 40.

In this embodiment, the second electrode 40 includes a portion having an elongate circular-columnar shape. The second electrode 40 is similar in shape, diameter, and material to the first electrode 30, but design of the second electrode 40 is not limited to such a case. The shape, the diameter, and the material of the second electrode 40 may be different from those of the first electrode 30.

2-4. Gas Supply Pump

The gas supply pump 70 is one example of a gas supply device for supplying the gas 3 into the first insulator 50, and ejecting the gas 3 into the liquid 2 through the first opening 52. More specifically, the gas supply pump 70 supplies the gas 3 to the space 51 in the first insulator 50 and to the space 61 in the second insulator 60 via the through-hole 34a and the through-hole 34b, respectively.

Gas 3a supplied to the space 51 via the through-hole 34a is ejected into the liquid 2 after passing between the inner surface of the first insulator 50 and the outer surface of the second insulator 60 (i.e., through the space 51). On that occasion, the gas 3a covers both the first electrode 30 and the second insulator 60. Therefore, the first electrode 30 and the second insulator 60 can be suppressed from coming into contact with the liquid 2.

Gas 3b supplied to the space 61 via the through-hole 34b is ejected into the liquid 2 after passing between the lateral surface of the first electrode 30 and the inner surface of the second insulator 60 (i.e., through the space 61). On that occasion, the gas 3b not only covers the first electrode 30, but also flows along the surface of the first electrode 30. Therefore, it is possible to remove heat from the first electrode 30. In other words, the gas 3b has an effect of cooling the first electrode 30. Because heat is less apt to accumulate in the first electrode 30, a discharge mode can be suppressed from being transited to arc discharge, and the discharge is stabilized. As a result, the plasma can be produced stably.

In an example, the gas supply pump 70 takes in ambient air and supplies the taken-in air as the gas 3. However, the gas supply pump 70 is not limited to such an example. Alternatively, the gas supply pump 70 may supply, as the gas 3, argon, helium, nitrogen gas, or oxygen gas, for example.

A flow rate of the gas 3 supplied from the gas supply pump 70 is not less than 0.5 L/min, for example. At the start of operation of the liquid treatment apparatus 1 according to this embodiment, when the space 51 and the space 61 are filled with the liquid 2, the gas 3 supplied from the gas supply pump 70 pushes out the liquid 2, which is stored in the space 51 and the space 61, through the first opening 52 and the second opening 62 to such an extent that the first electrode 30 is covered with the gas 3. The gas 3 is ejected into the liquid 2 inside the reaction vessel 10 through the first opening 52. The reaction vessel 10 may include an opening through which the gas 3 supplied from the gas supply pump 70 is exhausted on that occasion.

2-5. Liquid Supply Pump

The liquid supply pump 80 is an example of a liquid supply device for circulating the liquid 2 inside the reaction vessel 10. The liquid 2 may be stirred using a stirrer.

2-6. Power Supply

The power supply 90 applies a voltage between the first electrode 30 and the second electrode 40, thereby producing the plasma 4. More specifically, the power supply 90 applies a pulse voltage or an AC voltage between the first electrode 30 and the second electrode 40.

The applied voltage may be, for example, a high-voltage pulse of from 2 kV to 50 kV and from 1 Hz to 100 kHz with positive polarity. As an alternative, the applied voltage may be determined such that an electric field of from 2 kV/cm to 50 kV/cm is generated between the first electrode 30 and the gas-liquid interface 5, or between the first electrode 30 and the inner surface of the second insulator 60. A voltage waveform may be any of a pulse shape, a semi-sinusoidal waveform, or a sinusoidal waveform. A current value flowing between the first electrode 30 and the second electrode 40 is from 1 mA to 3 A, for example. Here, by way of example, the power supply 90 applies a positive pulse voltage with a frequency of 30 kHz and a peak voltage of 4 kV.

3. Operation

The operation of the liquid treatment apparatus 1 according to this embodiment will be described below.

In the liquid treatment apparatus 1 according to this embodiment, the gas supply pump 70 supplies the gas 3 while the liquid supply pump 80 circulates the liquid 2 in the reaction vessel 10. The gas 3 supplied from the gas supply pump 70 is fed to the space 51 and the space 61 via the through-holes 34. The flow rate of the gas 3 is 1.0 L/min, for example. With the supply of the gas 3 from the gas supply pump 70, the space 51 and the space 61 are filled with the gas 3, and the first electrode 30 and the second insulator 60 are brought into a state not contacting the liquid 2.

The power supply 90 applies a voltage between the first electrode 30 and the second electrode 40 in a state where the first electrode 30 is covered with the gas 3. In an example, the power supply 90 applies, to the first electrode 30, a positive pulse voltage with a frequency of 30 kHz and a peak voltage of 4 kV. As a result, discharge is generated in the gas 3, which covers the first electrode 30, starting from the end surface 33 of the first electrode 30, and the plasma 4 is produced. The discharge is generated mainly between the first electrode 30 and the gas-liquid interface 5 and between the first electrode 30 and the inner surface of the second insulator 60. Reactive species, such as chemical species and active species, are generated with the plasma 4 and are taken into the liquid 2. Because the liquid 2 is circulated, the chemical species and the active species can be diffused to the entirety of the liquid 2.

4. Advantageous Effects

The advantageous effects of the liquid treatment apparatus 1 according to this embodiment will be described below in comparison with a liquid treatment apparatus of related art. In the following, simulation results in the case of applying electric potentials to respective electrode sections in Comparative Example and Example are described.

Figure 3:
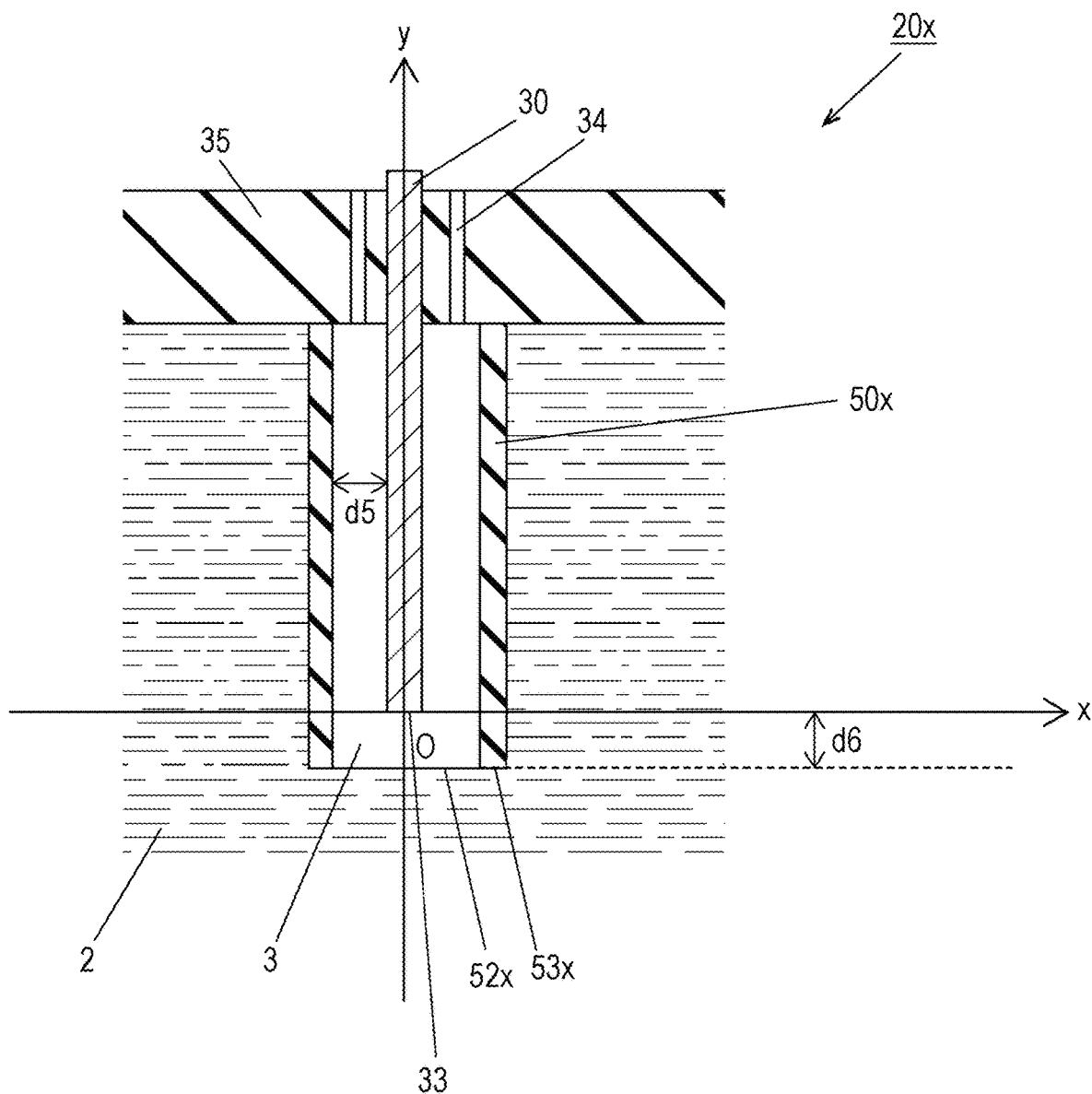
FIG. 3 illustrates a structure of an electrode section in a liquid treatment apparatus according to Comparative Example.

FIG. 3 illustrates a structure of an electrode section 20x in the liquid treatment apparatus according to the Comparative Example. More specifically, FIG. 3 illustrates an example of a cross-section of the electrode section 20x.

As illustrated in FIG. 3, the electrode section 20x includes the first electrode 30, the holder 35, and a first insulator 50x. The electrode section 20x according to the Comparative Example includes the first insulator 50x, but it does not include the second insulator 60. Thus, in the electrode section 20x according to the Comparative Example, there is just one insulator that surround the first electrode 30.

In the Comparative Example, the first electrode 30 has a diameter of 0.8 mm. The first insulator 50x has a thickness of 0.5 mm, and it is formed using alumina ceramic. A distance d5 between the first electrode 30 and an inner surface of the first insulator 50x is 0.1 mm. A distance d6 between the end surface 33 of the first electrode 30 and a first opening 52x of the first insulator 50x is 2 mm. When a high voltage is applied between the first electrode 30 and the second electrode 40 from the power supply 90, discharge occurs between the first electrode 30 and the gas-liquid interface 5.

Figure 4:
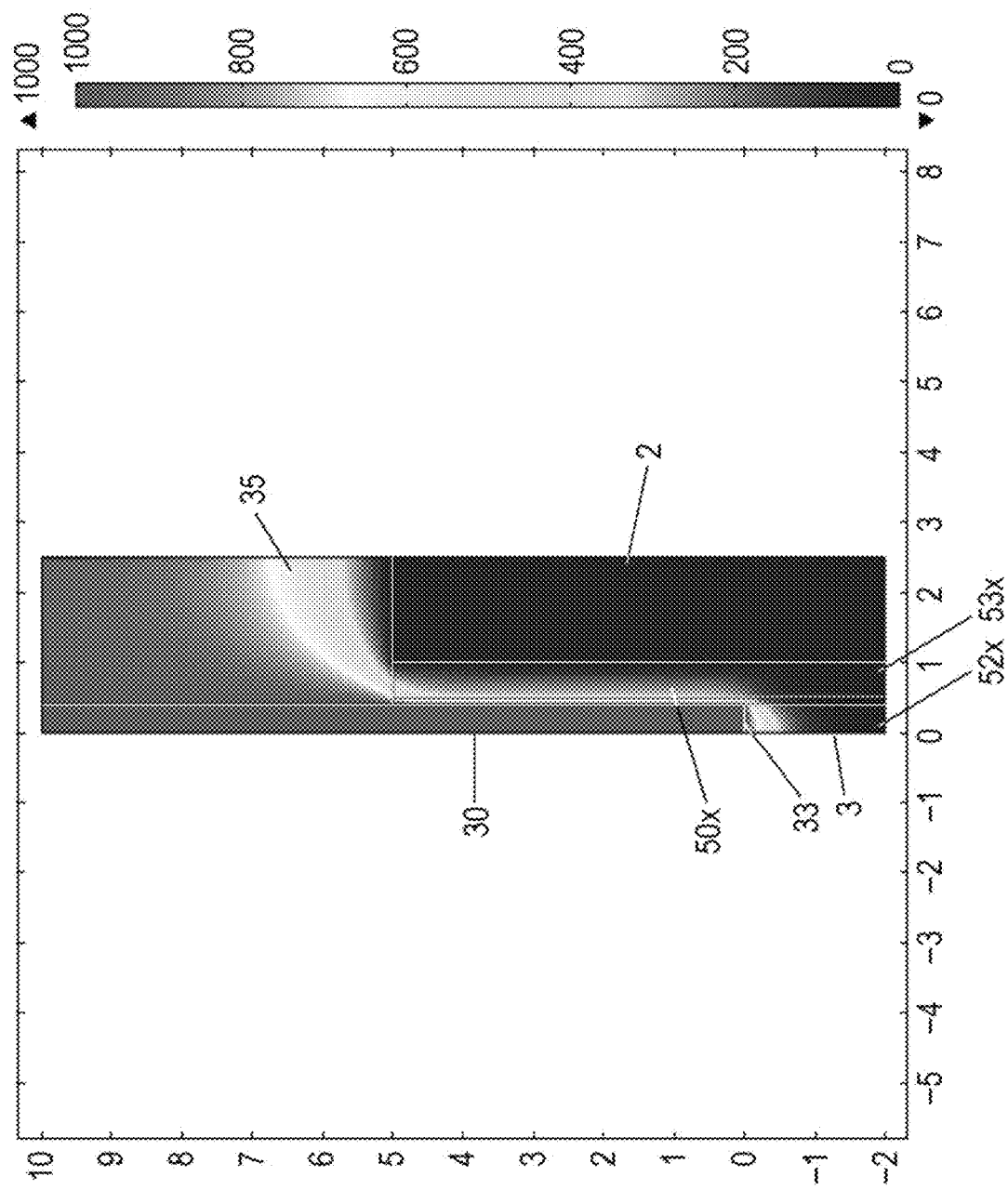
FIG. 4 is a graph representing a simulation result of electric potential distribution in the electrode section in the liquid treatment apparatus according to the Comparative Example illustrated in FIG. 3.

FIG. 4 is a graph representing a simulation result of electric potential distribution in the electrode section 20x in the liquid treatment apparatus according to the Comparative Example illustrated in FIG. 3. FIG. 4 represents the electric potential distribution in a right half region from a center axis of the first electrode 30. In FIG. 4, a horizontal axis and a vertical axis correspond to an x axis and a y axis illustrated in FIG. 3, respectively. Thus, the origin O (0, 0) is set to a center of the end surface 33 of the first electrode 30. FIG. 4 represents the electric potential distribution when an electric potential of 1 kV is applied to the first electrode 30 and when an electric potential of 0 V is applied to the first opening 52x, a first end surface 53x, and an outer surface of the first insulator 50x through the liquid 2.

In the electrode section 20x according to the Comparative Example, because the distance between the first electrode 30 and the inner surface of the first insulator 50x is short, a high electric field is applied thereto and discharge is generated between them. At that time, since the first end surface 53x of the first insulator 50x is in contact with the liquid 2, the liquid 2 is caused to enter the inside of the first insulator 50x along its inner surface from the first end surface 53x of the first insulator 50x due to electro-osmosis. Here, when the liquid 2 contains substances such as silica, for example, the liquid 2 having entered along the inner surface of the first insulator 50x is plasma-treated, and the substances such as silica are precipitated and deposited on the inner surface of the first insulator 50x or at a peripheral edge of the first opening 52x.

On the other hand, in the liquid treatment apparatus 1 according to this embodiment, as illustrated in FIG. 2, the second insulator 60 is disposed between the first insulator 50 and the first electrode 30. Therefore, discharge is more apt to occur between the first electrode 30 and the second insulator 60, which are spaced from each other by a relatively short distance. At that time, since the second insulator 60 is not in contact with the liquid 2, the liquid 2 containing substances such as silica is suppressed from entering the inside of the second insulator 60 along its inner surface, and precipitation of silica, etc. is suppressed.

The reason why the second insulator 60 does not contact the liquid 2 resides in that the gas 3 supplied from the gas supply pump 70 is held around both the end surface 33 of the first electrode 30 and the second opening 62 of the second insulator 60. In this connection, the gas 3 can be more easily held when the first end surface 53 of the first insulator 50 is projected outward by a distance from about 1 mm to 2 mm, for example, in comparison with the second end surface 63 of the second insulator 60.

Figure 5:
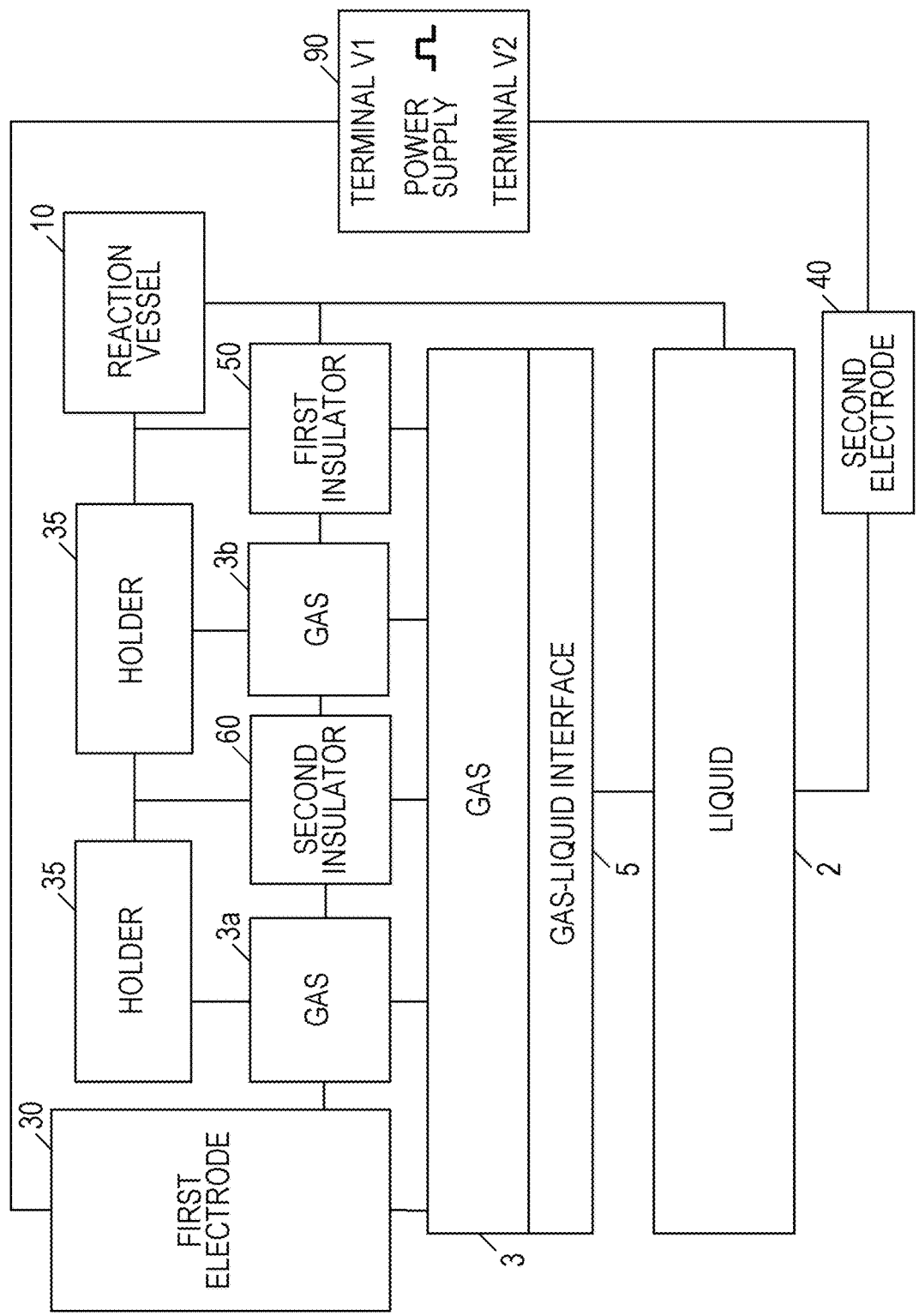
FIG. 5 is a chart representing electrical connection in the liquid treatment apparatus according to the embodiment.

FIG. 5 is a chart representing electrical connection in the liquid treatment apparatus 1 according to the embodiment.

As illustrated in FIG. 5, a voltage V1 is applied to the first electrode 30 from one terminal of the power supply 90, and a voltage V2 is applied to the second electrode 40 from the other terminal of the power supply 90. An electric potential of the gas-liquid interface 5 is mainly applied from the second electrode 40 through the liquid 2. Electric potentials of portions in contact with the liquid 2, i.e., electric potentials of the outer surface and the first end surface 53 of the first insulator 50, the inner wall surface of the reaction vessel 10, etc., are also applied from the second electrode 40 through the liquid 2.

Figure 6A:
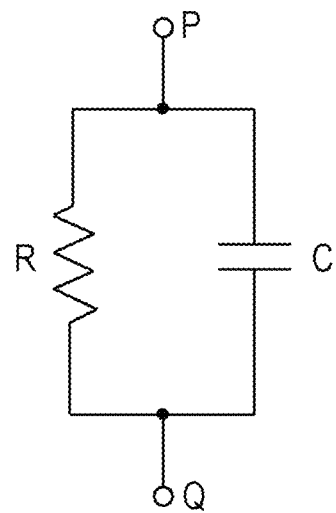
FIG. 6A illustrates one example of an equivalent circuit of a liquid.
Figure 6B:
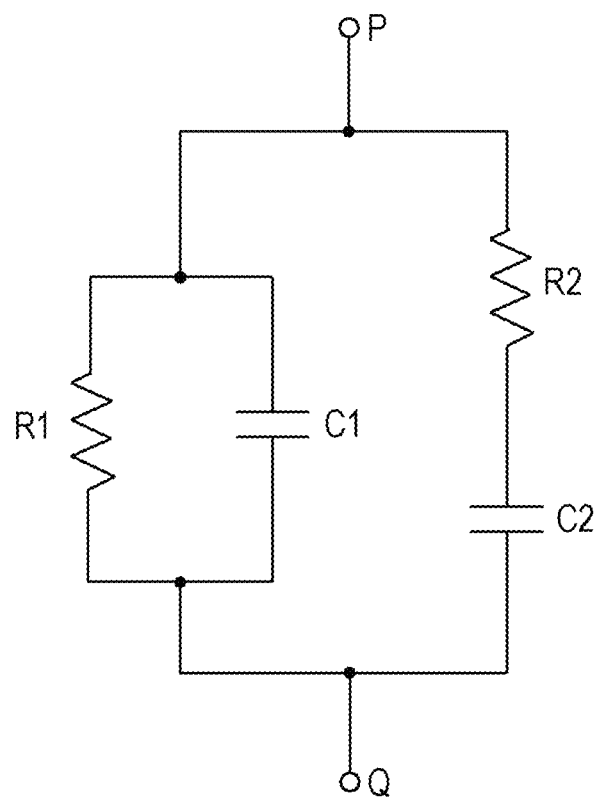
FIG. 6B illustrates another example of the equivalent circuit of the liquid.

The liquid 2 has two properties, i.e., conductive and capacitive properties. FIGS. 6A and 6B each illustrate one example of an equivalent circuit of the liquid 2. The liquid 2 can be regarded as a parallel circuit of a resistance R and a capacitance C, for example, as illustrated in FIG. 6A. Alternatively, the liquid 2 can be regarded as a parallel circuit including a parallel circuit of a resistance R1 and a capacitance C1 and a serial circuit of a resistance R2 and a capacitance C2, as illustrated in FIG. 6B. In FIG. 6A or 6B, an electric potential of a terminal P corresponds to the electric potential of the second electrode 40. An electric potential of a terminal Q corresponds to the electric potential of the portion in contact with the liquid 2. Thus, the electric potentials of the portions in contact with the liquid 2, i.e., the electric potentials of the outer surface and the first end surface 53 of the first insulator 50, the inner wall surface of the reaction vessel 10, etc., are each given by the electric potential of the terminal Q illustrated in FIG. 6A or 6B.

Because the second insulator 60 is fixed between the first electrode 30 and the second electrode 40 by the holder 35, the second insulator 60 has an electric potential affected by the liquid 2, the reaction vessel 10, the holder 35, the first insulator 50, the gas 3a, and the gas 3b, which are present around the second insulator 60. When the spacing between the second insulator 60 and the first electrode 30 is short and a high electric field is generated, discharge occurs between the second insulator 60 and the first electrode 30 as well.

In addition, as seen from FIG. 5, the electric potential of the first insulator 50 is further affected by the first electrode 30 through the holder 35. Accordingly, an electric potential is further applied to the first insulator 50 from the first electrode 30 through the holder 35 in addition to the electric potential applied to the first insulator 50 from the second electrode 40 through the liquid 2. This causes an electric potential difference between an end surface of the first insulator 50 on the side closer to the holder 35 and the first end surface 53 of the first insulator 50 on the side closer to the liquid 2.

Figure 7:
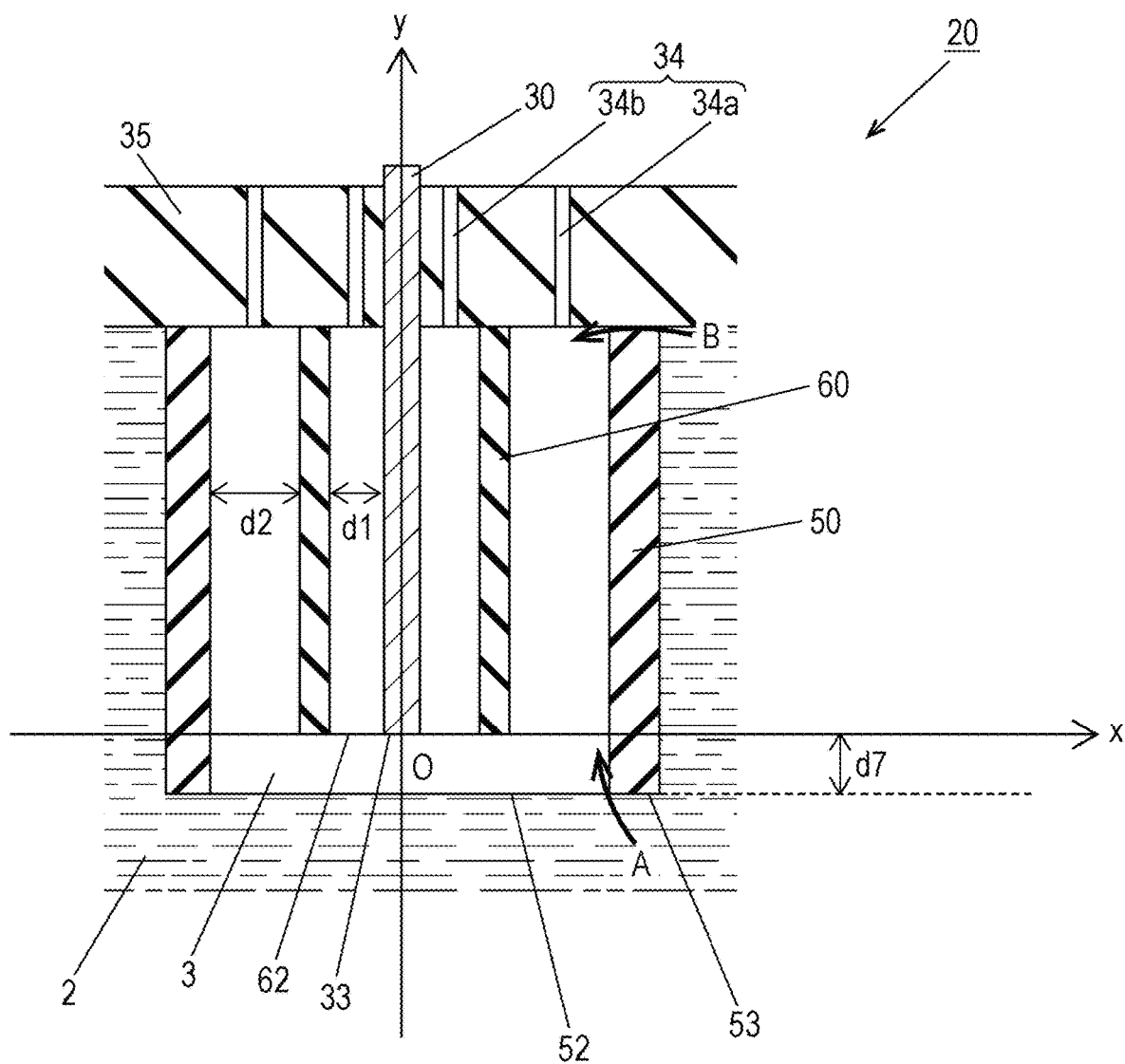
FIG. 7 illustrates a structure of an electrode section in a liquid treatment apparatus according to Example.

FIG. 7 illustrates a structure of the electrode section 20 in the liquid treatment apparatus according to Example. Simulation was performed on the electrode section 20 according to the Example, illustrated in FIG. 7, under conditions identical to those set in the simulation performed on the electrode section 20x according to the Comparative Example, illustrated in FIGS. 3 and 4.

The electrode section 20 illustrated in FIG. 7 is different from the electrode section 20 illustrated in FIG. 2 in the following point to obtain simulation conditions identical to those set in the simulation performed on the electrode section 20x according to the Comparative Example. A first different point is that a connected portion between the holder 35 and the first insulator 50 is in contact with the liquid 2. A second different point is that the end surface 33 of the first electrode 30 and the second opening 62 of the second insulator 60 are flush with each other. In other words, FIG. 7 represents the case where the retracted distance d3 of the end surface 33 of the first electrode 30 from the second opening 62 of the second insulator 60 is zero (0).

In the Example of FIG. 7, the diameter of the first electrode 30 is 0.8 mm. The thickness of each of the first insulator 50 and the second insulator 60 is 0.5 mm, and each insulator is formed using alumina ceramic. The distance d1 between the first electrode 30 and the inner surface of the second insulator 60 is 0.1 mm. The distance d2 between the outer surface of the second insulator 60 and the inner surface of the first insulator 50 is 2.5 mm. The distance d7 between the end surface 33 of the first electrode 30 and the first end surface 53 is 2 mm. When a high voltage is applied between the first electrode 30 and the second electrode 40 from the power supply 90, discharge occurs between the first electrode 30 and the gas-liquid interface 5.

In the electrode section 20 illustrated in FIG. 7, there are two paths through which the liquid 2 may enter the inside of the first insulator 50. More specifically, as denoted by fat arrows in FIG. 7, there are a path A allowing the liquid 2 to enter along the inner surface of the first insulator 50 from the first opening 52, and a path B allowing the liquid 2 to enter along a boundary portion between the holder 35 and the first insulator 50. In the case of any of those two paths A and B, the liquid 2 is more apt to infiltrate due to the electro-osmosis as an electric field generated in the path increases, and the infiltration of the liquid 2 can be suppressed to a lower level as the electric field decreases.

Figure 8:
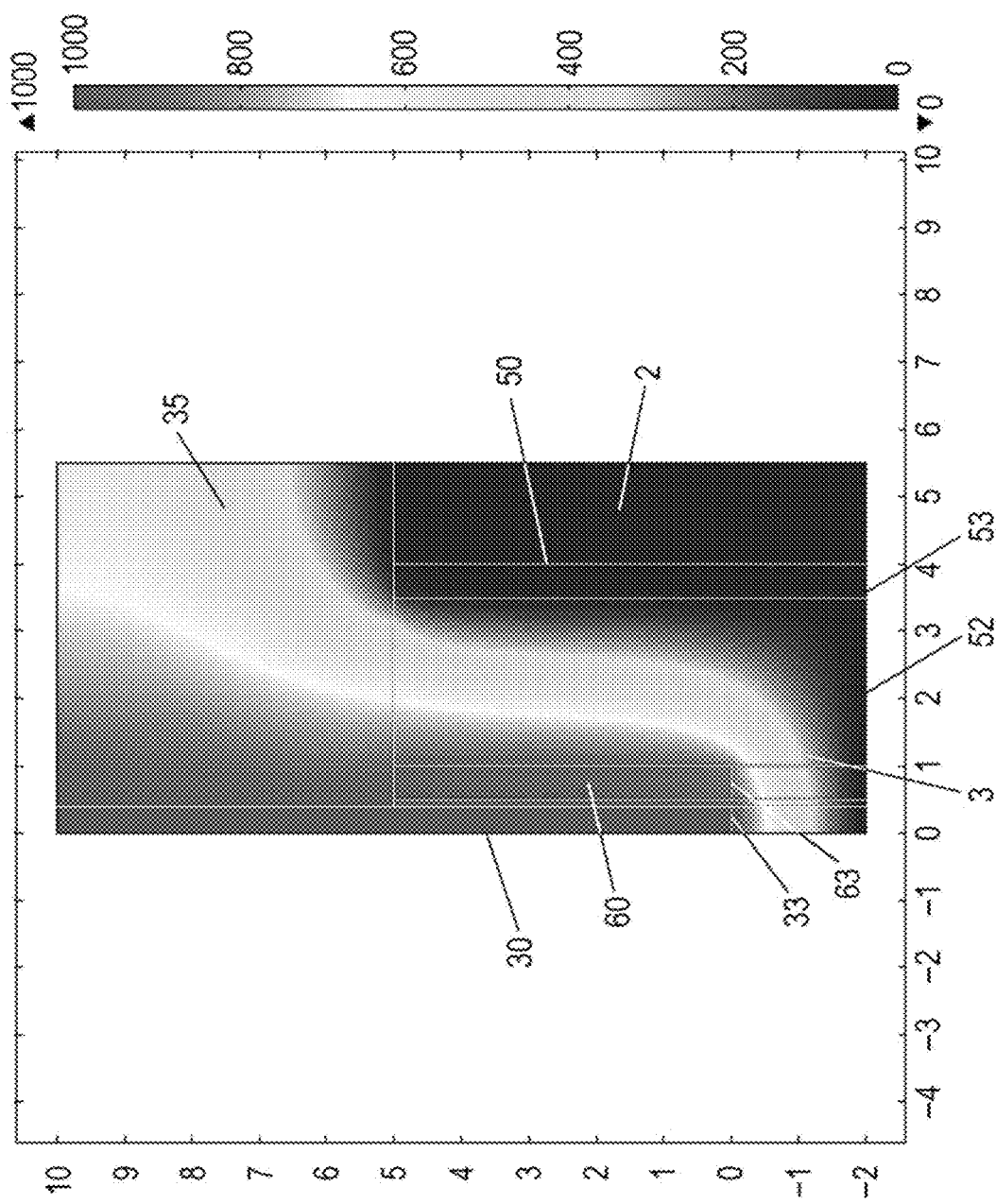
FIG. 8 is a graph representing a simulation result of electric potential distribution in the electrode section in the liquid treatment apparatus according to the Example illustrated in FIG. 7.

FIG. 8 is a graph representing a simulation result of electric potential distribution in the electrode section 20 in the liquid treatment apparatus according to the Example illustrated in FIG. 7. FIG. 8 represents, as in FIG. 4, the electric potential distribution in a right half region from the center axis of the first electrode 30. In FIG. 8, a horizontal axis and a vertical axis correspond to an x axis and a y axis illustrated in FIG. 7, respectively. Thus, the origin O (0, 0) is set to the center of the end surface 33 of the first electrode 30. FIG. 8 represents the electric potential distribution when an electric potential of 1 kV is applied to the first electrode 30 and when an electric potential of 0 V is applied to the first opening 52, the first end surface 53, and the outer surface of the first insulator 50 through the liquid 2.

Figure 9:
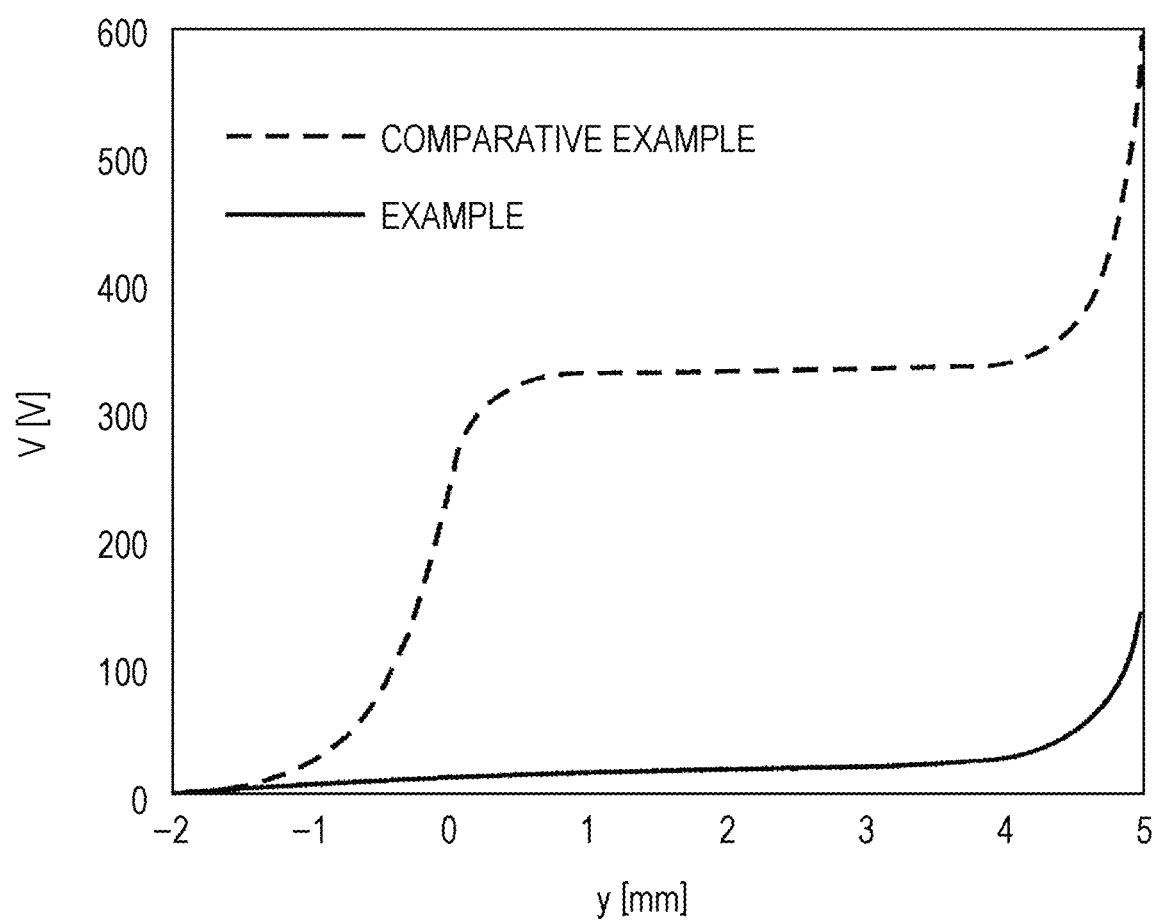
FIG. 9 is a graph representing electric potential distributions at inner surfaces of first insulators in the Example and the Comparative Example.

FIG. 9 is a graph representing electric potential distributions at the inner surfaces of the first insulator 50 in the Example and the first insulator 50x in the Comparative Example. More specifically, FIG. 9 represents the electric potential distribution along a linear line that is expressed by x=3.5 mm (i.e., along the inner surface of the first insulator 50) in the Example, and the electric potential distribution along a linear line that is expressed by x=0.5 mm (i.e., along the inner surface of the first insulator 50x) in the Comparative Example.

Moreover, y=−2 mm corresponds to the first end surface 53 and the first end surface 53x, and y=5 mm corresponds to the boundary portion between each of the first insulator 50 and the first insulator 50x and the holder 35. In addition, y=0 mm corresponds to the end surface 33 of the first electrode 30.

As seen from FIG. 9, regarding the electrode section 20x according to the Comparative Example, a steep slope of the electric potential is observed in a range from a position corresponding to the first end surface 53x of the first insulator 50x (i.e., y=−2 mm) to a position corresponding to the end surface 33 of the first electrode 30 (i.e., y=0 mm). Thus, in the electrode section 20x according to the Comparative Example, the Maxwell stress acts on the liquid 2 and the electro-osmosis occurs because a strong electric field is generated in the above-mentioned region.

On the other hand, regarding the electrode section 20 according to the Example, a steep slope of the electric potential is observed at the boundary portion between the first insulator 50 and the holder 35 (i.e., y=5 mm). However, a strong electric field is not generated near the first end surface 53 of the first insulator 50 (i.e., y=−2 mm), which is in contact with the liquid 2. Therefore, the electro-osmosis of the liquid 2 through the first opening 52 can be suppressed.

In the Example, since the second insulator 60 tending to cause discharge with respect to the first electrode 30 is not in contact with the liquid 2, the plasma produced by the discharge is less apt to contact the liquid 2 near the second insulator 60 due to the specific feature of the Example. Furthermore, since the first insulator 50 is arranged outside the second insulator 60, the electric potential of the second insulator 60 at the end surface thereof on the side closer to the holder 35 is low. Accordingly, an electric potential difference along the inner surface of the second insulator 60 in the y-axis direction is reduced, and the Maxwell stress causing the electro-osmosis is also reduced. As a result, silica is hard to precipitate on the inner surface of the second insulator 60, and abnormal discharge is suppressed, whereby the plasma can be produced stably.

Figure 10:
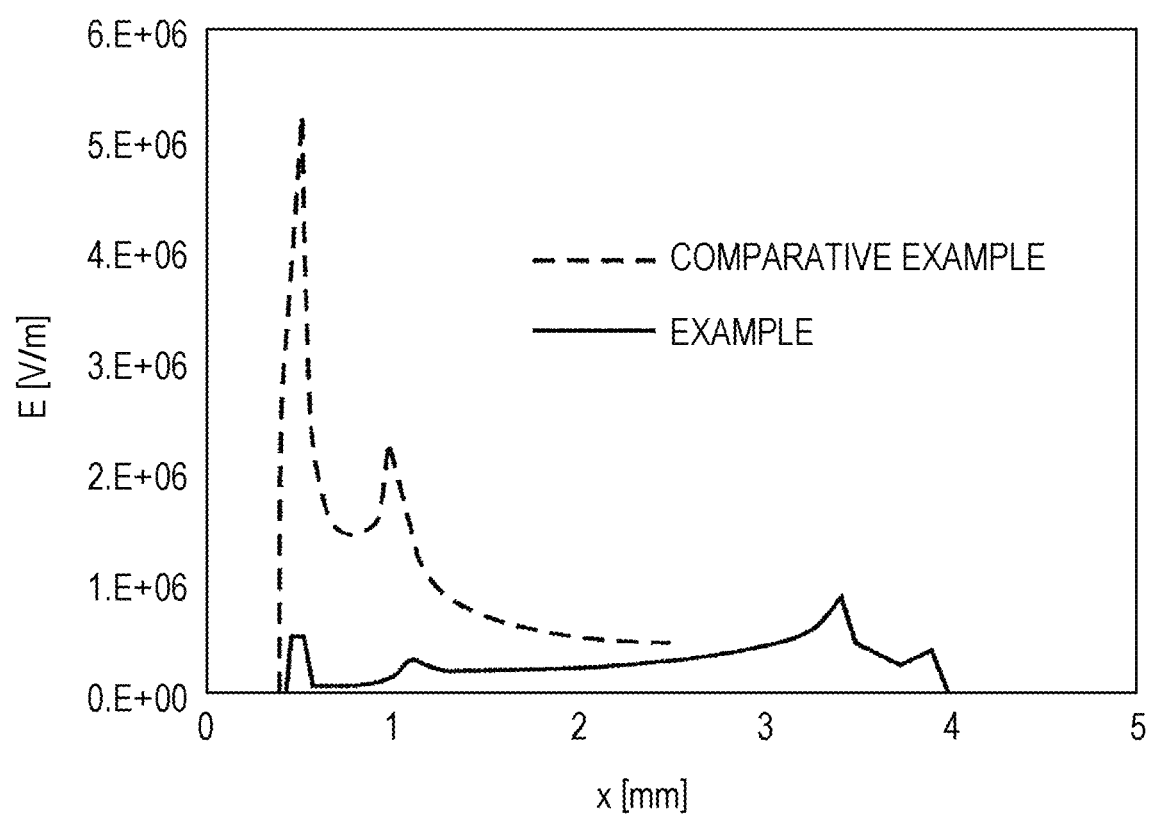
FIG. 10 is a graph representing electric field distributions at inner surfaces of respective holders in the Example and the Comparative Example.

FIG. 10 is a graph representing electric field distributions at inner surfaces of respective holders 35 in the Example and the Comparative Example. More specifically, FIG. 10 represents the electric field distribution along a linear line that is expressed by y=5 mm (i.e., along the inner surface of the holder 35). In other words, FIG. 10 represents the electric field distributions in the boundary portion between the holder 35 and the first electrode 30 and in the boundary portion between the holder 35 and each of the first insulator 50 and the first insulator 50x.

Regarding the electrode section 20x according to the Comparative Example, it is observed that a large electric field in excess of 1 MV/m is applied to the boundary portion between the first insulator 50x and the holder 35 (i.e., in a range of x=0.5 mm to 1.0 mm). When the liquid 2 is in contact with the connected portion between the first insulator 50x and the holder 35 as illustrated in FIG. 3, the liquid 2 exhibits the electro-osmosis through a gap at the connected portion due to the Maxwell stress if an electric field in the connected portion is large. Thus, the liquid 2 enters the space between the first electrode 30 and the first insulator 50x, thereby causing abnormal discharge.

On the other hand, regarding the electrode section 20 according to the Example, the electric field near the boundary portion between the holder 35 and the first insulator 50 (i.e., in a range of x=3.5 mm to 4.0 mm) is mitigated. Accordingly, the electro-osmosis of the liquid 2 in the boundary portion can be suppressed.

Thus, with the liquid treatment apparatus 1 according to this embodiment, since the insulator surrounding the first electrode 30 is constituted by inner and outer double insulators, the electric field generated at the inner surface of the first insulator 50 on the outer side is relatively small. As a result, the electro-osmosis is less apt to occur along the inner surface of the first insulator 50, and the liquid 2 is less apt to enter the inside of the first insulator 50 along its inner surface.

Furthermore, the discharge is more apt to occur between the first electrode 30 and the second insulator 60 on the inner side. Accordingly, even if the liquid 2 enters the inside of the first insulator 50 along its inner surface, the liquid 2 having entered is less exposed to the plasma. Moreover, when the gas 3 is supplied, the second insulator 60 is covered with the supplied gas 3, and hence the liquid 2 hardly enters the inside of the second insulator 60 along its inner surface.

With the liquid treatment apparatus 1 according to this embodiment, as described above, precipitates of silica and so on can be suppressed from being deposited on the inner surfaces of both the first insulator 50 and the second insulator 60. Hence the discharge is stabilized, and the plasma can be produced stably.

Modification

A modification of the embodiment will be described below.

Figure 11:
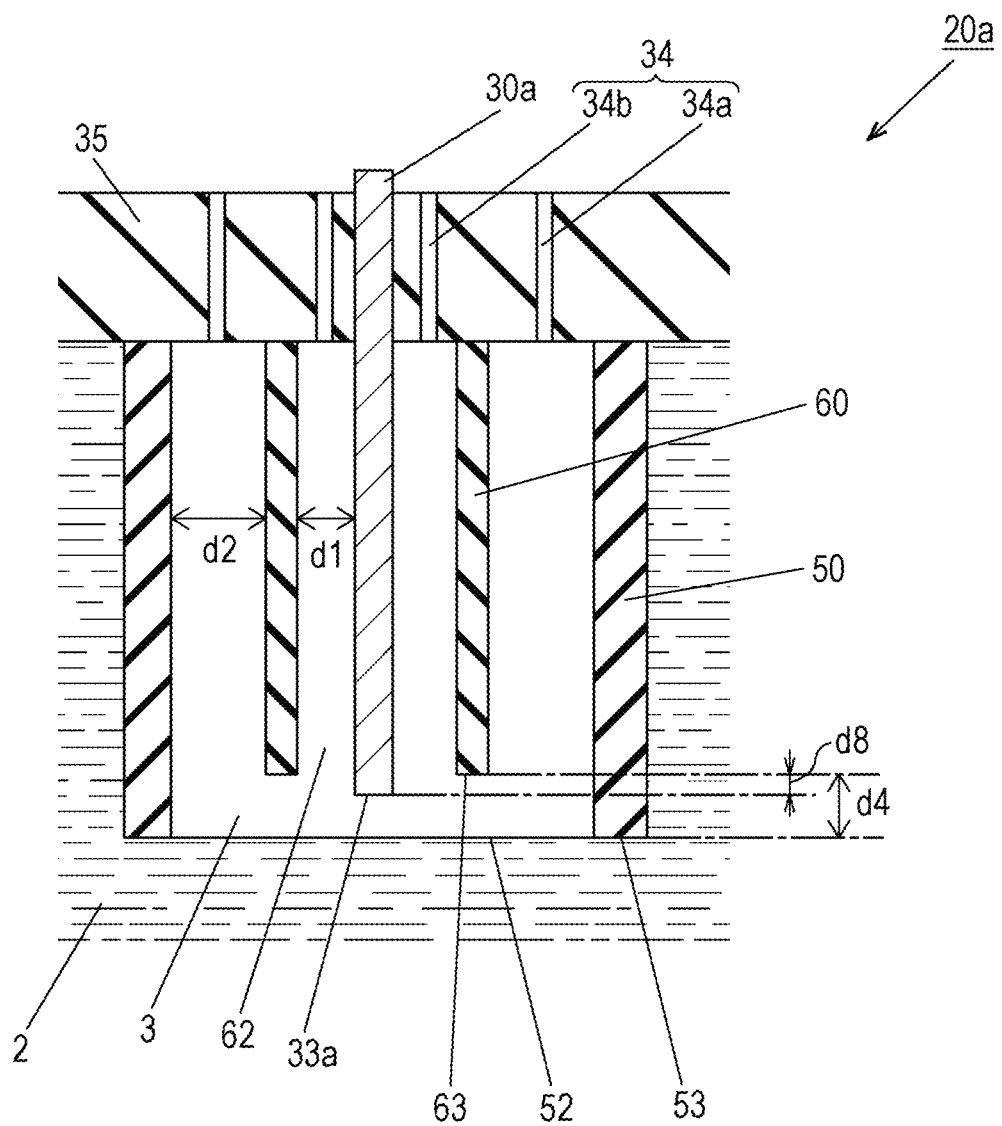
FIG. 11 illustrates a structure of an electrode section in a liquid treatment apparatus according to a modification.

FIG. 11 illustrates a structure of an electrode section 20a in a liquid treatment apparatus according to the modification. As illustrated in FIG. 11, an end surface 33a of a first electrode 30a is projected outward from the second opening 62 of the second insulator 60 by a distance denoted by d8. The projected distance d8 is not less than 0.1 mm and not more than 3 mm, for example.

In this embodiment, the end surface 33a is projected outward from the second opening 62, but it is retracted inward from the first opening 52 of the first insulator 50. In other words, the projected distance d8 is smaller than the retracted distance d4 of the second end surface 63 of the second insulator 60 from the first opening 52. Thus, since the end surface 33a is positioned closer to the gas-liquid interface 5, the discharge is more apt to occur between the end surface 33a and the gas-liquid interface 5.

When the inner diameter of the first insulator 50 is relatively large, for example, the electric field at the inner surface of the first insulator 50 near the first opening 52 is reduced. By increasing the inner diameter of the first insulator 50, therefore, the liquid 2 is less apt to enter the inside of the first insulator 50 along its inner surface, and hence precipitation of silica and so on can be suppressed.

However, when the inner diameter of the first insulator 50 is increased, the gas 3 is supplied in a larger amount to fill the inner space of the first insulator 50 with the gas 3. This may lead to a possibility that the gas-liquid interface 5 is moved away from the end surface 33a of the first electrode 30a, and that the discharge is less apt to occur.

According to this modification, since the end surface 33a of the first electrode 30a and the gas-liquid interface 5 can be positioned closer to each other, the discharge is more apt to occur, and hence the plasma 4 can be produced stably.

As an alternative, the end surface 33a of the first electrode 30a may be located at the same position as the second opening 62 of the second insulator 60. In other words, the end surface 33a and the second end surface 63 (i.e., the second opening 62) may be flush with each other.

Other Embodiments

While the liquid treatment apparatus according to one general aspect has been described above in connection with the embodiment, the present disclosure is not limited to that embodiment. Other embodiments obtained by modifying the above embodiment in various ways conceivable by those skilled in the art, and still other embodiments constituted by combining individual components in the different embodiments are also included in the scope of the present disclosure insofar as not departing from the gist of the present disclosure.

For instance, while the liquid 2 is circulated by the liquid supply pump 80 in the above embodiment, the present disclosure is not limited to such an example. In the liquid treatment apparatus 1, as another example, the plasma 4 may be produced in the liquid 2 not flowing (e.g., in static water).

While the above embodiment has been described in connection with an example in which tap water containing silica is used as the liquid 2, the present disclosure is not limited to that example. The liquid 2 may be pure water, or may be a liquid containing a mineral component such as calcium, for example.

While the above embodiment has been described in connection with an example in which the first electrode 30, the first insulator 50, and the second insulator 60 are inserted from above the liquid 2 to be dipped in the liquid 2, the present disclosure is not limited to that example. The first electrode 30, the first insulator 50, and the second insulator 60 may be arranged in a state horizontally projecting from a lateral surface of the reaction vessel 10. As an alternative, the first electrode 30, the first insulator 50, and the second insulator 60 may be arranged in a state vertically projecting upward from a bottom surface of the reaction vessel 10. When the gas 3 is not supplied, the entirety of the first electrode 30 may be in contact with the liquid 2.

While the above embodiment has been described in connection with an example in which the end surface 33 of the first electrode 30 and the second end surface 63 of the second insulator 60 are retracted inward from the first opening 52 of the first insulator 50, the present disclosure is not limited to that example. As an alternative, at least one of the end surface 33 and the second end surface 63 may be projected outward from the first opening 52, or may be located at the same position as the first opening 52. In such a case, the end surface 33 and the second end surface 63 are located at positions where they are covered with the supplied gas 3, when the gas 3 is supplied.

It is to be noted that the above-described embodiments may be subjected to various alterations, replacements, additions, omissions, etc. within the scope of Claims or the scope equivalent thereto.

What is claimed is:

1. A liquid treatment apparatus comprising:
   a vessel for storing a liquid;
   a first electrode;
   a second electrode at least a part of which is arranged inside the vessel;
   a first insulator having a tubular shape and a first opening at an end of the first insulator, the first insulator surrounding a lateral surface of the first electrode with a first space interposed between the first insulator and the lateral surface of the first electrode;
   a second insulator having a tubular shape, the second insulator surrounding the lateral surface of the first electrode;
   a gas supply device that supplies gas into the first space and ejects the gas into the liquid through the first opening; and
   a power supply that applies a voltage between the first electrode and the second electrode and produces plasma, wherein:
   the first insulator surrounds the second insulator,
   the second insulator is arranged with a second space interposed between the first insulator and the second insulator,
   the first opening of the first insulator is arranged to be in contact with the liquid when the liquid is stored in the vessel, and
   a portion of the first electrode, which is positioned inside the vessel, and a portion of the second insulator, which is positioned inside the vessel, are covered with the gas when the liquid is filled in the vessel and the gas is supplied into the first space by the gas supply device.

2. The liquid treatment apparatus according to claim 1, wherein at least a part of the first electrode is positioned below a surface level of the liquid.

3. The liquid treatment apparatus according to claim 1, wherein an end surface of the first electrode and an end surface of the second insulator are retracted from the first opening toward an interior of the first space.

4. The liquid treatment apparatus according to claim 1, wherein the first electrode includes a circular columnar portion,
   the first insulator and the second insulator surround a lateral surface of the circular columnar portion, and
   the circular columnar portion, the first insulator, and the second insulator are arranged coaxially.

5. The liquid treatment apparatus according to claim 1, wherein the second insulator surrounds the lateral surface of the first electrode with a third space interposed between the second insulator and the lateral surface of the first electrode, and includes a second opening at an end surface of the second insulator.

6. The liquid treatment apparatus according to claim 5, wherein an end surface of the first electrode is retracted from the second opening toward an interior of the third space.

7. The liquid treatment apparatus according to claim 5, wherein an end surface of the first electrode is projected from the second opening.

8. The liquid treatment apparatus according to claim 1, wherein the gas supply device ejects the gas into the liquid through the second space.

9. The liquid treatment apparatus according to claim 5, wherein the gas supply device ejects the gas into the liquid through the second space and the third space.

10. A liquid treatment method using a liquid treatment apparatus,
the liquid treatment apparatus comprising:
a vessel;
a first electrode;
a second electrode at least a part of which is arranged inside the vessel;
a first insulator having a tubular shape and a first opening at an end of the first insulator; and
a second insulator having a tubular shape, wherein:
the first insulator surrounds the second insulator and a lateral surface of the first electrode with a first space interposed between the first insulator and the lateral surface of the first electrode,
the second insulator surrounds the lateral surface of the first electrode, and
the second insulator is arranged with a second space interposed between the first insulator and the second insulator,
the liquid treatment method comprising:
supplying a liquid to be treated into the vessel such that the first opening of the first insulator is in contact with the liquid;
supplying gas into the first space such that the gas is ejected into the liquid through the first opening, and a portion of the first electrode, which is positioned inside the vessel, and a portion of the second insulator, which is positioned inside the vessel, are covered with the gas; and
applying a voltage between the first electrode and the second electrode and producing plasma, thereby treating the liquid.

11. The liquid treatment method according to claim 10, wherein at least a part of the first electrode is positioned below a surface level of the liquid.

12. The liquid treatment method according to claim 10, wherein an end surface of the first electrode and an end surface of the second insulator are retracted from the first opening toward an interior of the first space.

13. The liquid treatment method according to claim 10, wherein the first electrode includes a circular columnar portion,
the first insulator and the second insulator surround a lateral surface of the circular columnar portion, and
the circular columnar portion, the first insulator, and the second insulator are arranged coaxially.

14. The liquid treatment method according to claim 10, wherein the second insulator surrounds the lateral surface of the first electrode with a third space interposed between the second insulator and the lateral surface of the first electrode, and includes a second opening at an end surface of the second insulator.

15. The liquid treatment method according to claim 14, wherein an end surface of the first electrode is retracted from the second opening toward an interior of the third space.

16. The liquid treatment method according to claim 14, wherein an end surface of the first electrode is projected from the second opening.

17. The liquid treatment method according to claim 10, wherein the gas is ejected into the liquid through the second space.

18. The liquid treatment method according to claim 14, wherein the gas is ejected into the liquid through the second space and the third space.

* * * * *